United States Patent [19]

Olsen et al.

[11] 3,960,664

[45] June 1, 1976

[54] BACTERIAL PRODUCT USEFUL FOR MAKING SAUSAGE

[75] Inventors: Ronald H. Olsen, Ann Arbor; Harold Rothchild, Kalamazoo, both of Mich.

[73] Assignee: Microlife Technics, Inc., Sarasota, Fla.

[22] Filed: July 10, 1975

[21] Appl. No.: 594,797

Related U.S. Application Data

[60] Continuation of Ser. No. 870,992, Oct. 6, 1969, abandoned, which is a division of Ser. No. 620,643, March 6, 1967, Pat. No. 3,561,977.

[52] U.S. Cl. .................................. 195/59; 426/59
[51] Int. Cl.$^2$ ............................................ C12K 1/08
[58] Field of Search ........................................ 195/59

[56] References Cited
UNITED STATES PATENTS 3,410,755 11/1968 Etchells et al. ........................ 195/96
3,420,742 1/1969 Farr ........................................ 195/59

OTHER PUBLICATIONS

Journal of Dairy Science vol. 45 (Oct. 1962) pp. 1263–1266 and 1290–1294.

Joslyn et al., Food Processing Operations, vol. 2 (1963) pp. 482–496.

*Primary Examiner*—Lionel M. Shapiro
*Attorney, Agent, or Firm*—Ian C. McLeod

[57] ABSTRACT

A frozen stabilized bacterial product consisting of *Pediococcus cerevisiae* mixed with a stabilizing agent, such as glycerol, and a nutrient medium. A process of making a fermented meat product in which the thawed concentrate is mixed with a meat formulation in an amount of at least .1 percent by weight, then the mixture is heated to between 110° and 125°F. for from 8 to 15 hours and then the bacterial action is terminated.

4 Claims, No Drawings

BACTERIAL PRODUCT USEFUL FOR MAKING SAUSAGE

This is a continuation of application Ser. No. 870,992 filed Oct. 6, 1969, now abandoned, which is a division of Ser. No. 620,643, filed Mar. 6, 1967, now U.S. Pat. No. 3,561,977.

This invention relates to a concentrated bacterial product for use in making sausage and to a process of making sausage and, more particularly, relates to a sausage-making process and a bacterial product for use in the process in which the process is carried out at a higher temperature and more rapidly than known sausage-making processes and which makes it possible to produce sausage having closely controlled flavor and pH characteristics with less likelihood of spoilage.

It has been previously suggested to manufacture various sausage products, such as Thuringer, summer sausage, Cervalat, Lebanon bologna and pork roll by incorporating in the meat mixture a selected amount of the microorganism *Pediococcus cerevisiae* (sometimes also referred to as *micrococcus cerevisiae*), as described in Bergey's Manual of Determinative Bacteriology, 6th Edition, Page 249, under Genus B, Family — *Micrococcaceae*, Species 1, *Pediococcus cerevisiae*. The meat mixture is then allowed to ferment to form lactic acid and other products elaborated by the growth of the microorganism. These products provide a desirable flavor and pH to the sausage.

The prior art processes have been carried out at temperatures substantially below 110°F. and same have required relatively long "holding" times. That is, the time required for the sausage to ferment to the desired tanginess and/or pH has been as long as 48 hours to 6 days. It has been found that these relatively low temperatures, in addition to requiring longer "holding" times, also favor the growth of the indigenous microorganisms in the meat mixtures. There is a great variation in the numbers and kinds of the indigenous microorganisms in meat mixtures used for sausage making. The indigenous microorganisms also grow during the fermenting phase and produce various elaboration products which affect the flavor of the sausage. Thus, the flavor of the sausage, as prepared by the prior art processes, is subject to wide and uncontrollable variation, because of the variations in the numbers and kinds of the indigenous microorganisms. Moreover, it is not uncommon for sausage prepared in accordance with the prior art techniques to become spoiled during the fermenting procedure as a result of unexpected growth of indigenous putrefying microorganisms.

It has been previously suggested to use a freeze-dried culture of *Pediococcus cerevisiae* for fermenting meat mixtures. The freeze-dried or lyophilized cultures have long lag phases requiring 12 to 16 hours in the meat mass for the organisms to become active. During the thus extended lag phase undesirable bacteria, normally present in the meat and on equipment, also grow thus preventing controlled fermentation. It has been found that the use of a concentrated frozen concentrate of *Pediococcus cerevisiae*, which also includes a nutrient medium and a stabilizer, such as glycerol, produces a surprising and unexpected improvement in the sausage-making process. The frozen concentrated culture according to the present invention has a minimum lag phase enabling the bacteria to begin growing and generating acid almost immediately upon being warmed up. This rapid action inhibits the growth of undesirable bacteria which are usually present in the meat. Furthermore, by using elevated temperatures for carrying out the fermentation, the psychrophilic bacteria present in the meat (which grow only at lower temperatures) are completely inhibited.

In accordance with the present invention, it has been found that a meat mixture can be fermented to make a sausage product having closely controlled flavor and pH characteristics in a shorter time and with less likelihood of spoilage by inoculating the meat mixture with a thawed, previously frozen, concentrate of *Pediococcus cerevisiae* which has a cell count of at least $10^9$ cells per ml., together with a stabilizing agent, such as glycerol, and nutrient medium. The meat mixture, after being stuffed into casings, is then held at a temperature between 110° and 125°F. for a period of time between about 8 hours and about 15 hours so that the *Pediococcus cerevisiae* ferments the meat mixture. The substances elaborated by the *Pediococcus cerevisiae* during this period impart a desirable flavor and pH to the sausage. It has been discovered, unexpectedly in view of the prior art, that by carrying out the processing of the inoculated meat mixture as described above, the growth of the indigenous microorganisms is hindered and the growth of the *Pediococcus cerevisiae* is favored so that the flavor and pH characteristics of the resulting sausage product are determined essentially by the *pediococcus cerevisiae* and the indigenous microorganisms do not substantially affect the flavor of the sausage product and they are not as likely to cause putrefaction of the sausage product. Thus, the flavor of the sausage product can be very closely controlled in a manner which has not been suggested previously. Further, the sausage-making process can be carried out in considerably less time than the prior art processes. This makes it possible for the sausage maker to supply an unexpected demand for a particular type of sausage more quickly and also makes it possible for the sausage manufacturer to use less or smaller equipment than is required with the prior art processes.

After the end of the fermenting period, the sausage product is then heated to a temperature of over 138°F., preferably 142° to 152°F., to stop the growth of the microorganisms. Then the sausage product can be finished off in the usual manner and made ready for consumption.

The *Pediococcus cerevisiae* concentrate used in the process of the present invention can be produced by inoculating a suitable culture medium with *Pediococcus cerevisiae* under conditions favorable to the growth thereof. While the culture medium forms no part of the present invention, it has been found acceptable to use a culture medium consisting of the following:

600 Gallons Media

1. Corn Steep Water — 25 lbs.
2. Powdered Nonfat Dry Milk — 50 lbs.
3. Dextrose — 100 lbs.
4. Yeast Autolysate — 13 lbs. 5 oz.
5. $KH_2P_2O_7$ — 14 lbs. 4 oz.
6. $Na_2HPO_4$ — 9 lbs. 9 oz.
7. $H_2O$ — To bring mixture to 600 gallons The culture medium is inoculated with *Pediococcus cerevisiae* in a conventional manner and is then incubated for about 8–10 hours at a temperature of about 32°–37°C. The bacteria is then separated from the medium in which it has been grown and is concentrated, the concentration ordinarily being effected by centrifuging, although other procedures, such as dialysis, also appeared to be satisfactory for this purpose. The concentrated bacteria product is then mixed with other materials which serve to maintain the viability of the bacteria. It is particularly preferred to mix an effective amount of a stabilizing ingredient, preferably glycerol, and also fresh nutrient medium, with the bacteria as the admixture of these materials with the concentrated bacteria has been found to markedly improve the viability of the bacteria. For example, 3936 ounces of *Pediococcus cerevisiae* concentrate scraped or discharged from a centrifuge bowl can be mixed with 480 ounces of fresh culture medium and 127 ounces of glycerol in order to produce a highly satisfactory product for the purposes of this invention. The amounts of glycerol and fresh nutrient medium used can be varied widely. As little as 1.5 percent of glycerol based on the total weight of the product is satisfactory and no special advantage results from the use of more than about four percent by weight of glycerol in the concentrate. The amount of nutrient medium used should be at least above one to two percent of the total weight of the product. After the bacteria concentrate is mixed with the nutrient medium and stabilizing ingredient, the product is then frozen as rapidly as possible without drying. The product can then be held at −5°F. or below (optimum − 15°F.) for a long time without major loss in the viability of the bacteria.

The foregoing described steps of preparing the *Pediococcus cerevisiae* concentrate product will preferably be performed by a manufacturer of culture concentrates as this will insure that the *Pediococcus cerevisiae* concentrate will have a uniform high quality. This minimizes the equipment and handling costs that would otherwise be required in the sausage-making plant and, further, minimizes or eliminates the need for bacteriologically skilled personnel.

Regular meat formulations of any kind suitable for use for sausagemaking purposes can be used for the purposes of the present invention and, hence, same do not require detailed description herein. It will be understood that in addition to comminuted meat, the meat formulation may include suitable spices and other additives, such as sodium nitrite, sodium nitrate, milk powder or water, all in accordance with conventional practice. It will be found desirable to include in the meat formulation at least about 0.75 percent by weight of dextrose. The amount of sodium nitrite should be maintained between 0.0075 percent and about 0.015 percent by weight of the meat mixture to enable proper curing of the meat without excessive inhibition of the culture. The *Pediococcus cerevisiae* concentrate product is added in an amount of at least about 0.1 percent based on the weight of the meat mixture.

The *Pediococcus cerevisiae* concentrate product will be received, in a frozen condition, from the manufacturer thereof and, as described above, will contain in admixture therewith a stabilizing agent, such as glycerol, and a nutrient medium. It is essential for the purposes of the present invention that the bacteria concentrate product be obtained in a frozen condition, as distinguished from a freeze-dried condition, for the reasons previously discussed. The frozen concentrated product will be thawed before it is mixed into the meat formulation. A preferred procedure for thawing the frozen *Pediococcus cerevisiae* concentrate product and mixing it with the meat formulation involves placing a container filled with the concentrate in warm (80°–90°F.) water for about 10 minutes. Then the concentrate is removed from the container and is placed into a larger container which also has a considerable quantity of water therein, the water being at about room temperature (60°–70°F.). For example, from four to six ounces of a frozen *Pediococcus cerevisiae* concentrate product can be placed into a pail containing 5 to 10 pounds of tap water. The concentrate is melted by contact with the water and is mixed therewith. The amount of water mixed with the concentrate should be deducted from the amount of water called for in the particular meat formulation involved. The diluted thawed concentrate is then uniformly mixed with the meat formulation to which all of the spices and other additives have been added previously. The diluted culture should be added slowly while the meat formulation is being mixed by a power mixer so that the concentrate is uniformly mixed into the meat formulation. The temperature of the meat formulation should be maintained fairly constant at between 50° and 60°F. in all batches prepared in order to obtain substantially uniform tang levels.

After the *Pediococcus cerevisiae* concentrate product is uniformly mixed in the meat mixture, said meat mixture can then be stuffed into natural or fibrous casings in any manner customary in the sausage-making art.

The meat mixture is then processed as described further hereinafter and it is particularly to be noted that the meat mixture is not subjected to any holding period at a relatively low temperature before the subsequent processing begins. Rather, immediately after stuffing the casings, they are then processed as hereinafter further described so as to make it possible to produce the fermented sausage product as rapidly as possible.

The outsides of the stuffed casings should be pasteurized and this can be done by showering the casing with hot water (140° to 160°F.) for about 15 seconds. The stuffed casings are then placed in a steam box or a smokehouse which is maintained at a temperature of between 110° and 125°F., preferably at 115°F. The temperature is maintained substantially constant within this range and the casings are held in the steam box or smokehouse for from 8 to 15 hours so that the sausage product ferments and finally reaches a pH of 4.4 to 5.4, depending on the acidity desired. The desired tanginess of the sausage product will determine the length of time the product is held at the temperature of 110° to 125°F., it being understood that the product will become tangier and have a lower pH the longer it is held at the elevated temperature.

If a smokehouse is used, smoke may be introduced during the latter part or all of the fermenting period if a heavy smoke flavor in the sausage is required. If a steam box is used, the stuffed casing can then be transferred to a smokehouse for smoking purposes.

At the end of the 8 to 15 hour fermenting period described above, the stuffed casings are then heated as quickly as possible until the meat temperature reaches a level of at least 138°F., preferably 142° to 152°F., in order to stop the fermenting action. Then the stuffed casings can be finished off in the usual manner customary in the sausage-making art to make the sausages suitable for consumption.

The invention will be further described by reference to the following example.

EXAMPLE

A meat mixture of the following formulation was prepared:

| | |
|---|---|
| 80 lbs. | Boneless Beef Chucks |
| 60 lbs. | Lean Beef Trimmings |
| 60 lbs. | Regular Pork Trimmings |
| 6 lbs. | Salt |
| 2 lbs. | Dextrose |
| ½ oz. | Sodium Nitrite |
| 12 oz. | Black Pepper |
| 4 oz. | Mace |
| 2 oz. | Mustard Seed |
| 6 lbs. | Nonfat Dried Milk |
| 12 lbs. | Water |

Four ounces of frozen *Pediococcus cerevisiae* concentrate of the following formula was used:

*Pediococcus cerevisiae* — 86% – 97.5% by weight
Glycerol — 1.5% – 4% by weight
Nutrient Medium — 1% – 10% by weight The concentrate was thawed and diluted with tap water and then it was mixed into the meat formulation using a power mixer. The temperature of mixing was maintained at 55°F. The meat mixture was stuffed into casings and then the casings were immediately showered with hot water (140°F.) for 15 seconds. The casings were placed in a smokehouse which was maintained at a temperature of 115°F. The sausages were held in the smokehouse for 12 hours and smoke was introduced into the smokehouse beginning at the fourth hour. At the end of 12 hours, it was found that the meat mixture had a pH of 5.1. The temperature of the smokehouse was then raised to 160°F. and the sausages were smoked until the meat temperature reached 142°F. Thereupon, the sausages were removed from the smokehouse and were finished off in the usual manner. The sausages had a very acceptable and clean tangy flavor.

Additional batches of the meat formula were prepared and processed in the same fashion and it was found that the sausage product from the respective batches was of unexpectedly uniform taste and quality.

Although a particular preferred embodiment of the invention has been described, the invention contemplates such changes or modifications therein as lie within the scope of the appended claims.

The embodiments of the invention in which an exclusive property or privelege is claimed are defined as follows:

1. A bacterial product useful for fermenting comminuted meat containing sausage making ingredients consisting essentially of a substantially neutralized concentrate of live cells of *Pediococcus cerevisiae*, said concentrate being stabilized against rapid loss of viability by being in admixture with a freezing stabilizing agent and a nutrient medium, the concentrate being frozen so that it can be stored for a long time without major loss in the viability of the bacteria, the concentrate containing at least about $10^9$ cells per ml and wherein the growth of *Pediococcus cerevisiae* when the concentrate is admixed with comminuted meat containing sausage making ingredients inhibits the growth of indigenous bacteria in the meat.

2. A bacterial product according to claim 1, in which said concentrate contains at least about 1.5 percent by weight of glycerol as said stabilizing agent.

3. A bacterial product according to claim 1, in which said concentrate contains at least about 1 percent by weight of nutrient medium.

4. A bacterial product according to claim 3, in which said nutrient medium comprises about 25 parts by weight of corn steep water, about 50 parts by weight of powdered nonfat dry milk, about 100 parts by weight of dextrose, about 13.3 parts by weight of yeast autolyzate, about 14.25 parts of $KH_2P_2O_7$, about 9.55 parts of $Na_2HPO_4$ and sufficient water to bring the volume of the mixture to the equivalent of about 4980 parts by weight of water.

\* \* \* \* \*